3,437,163
FOUR-WHEEL DRIVE VEHICLE WITH
ARTICULATED FRAME
Donald R. Lemmerman, 519 Lincoln Ave. NE.,
St. Cloud, Minn. 56301
Filed July 27, 1967, Ser. No. 656,478
Int. Cl. B62d 15/00
U.S. Cl. 180—51                                    7 Claims

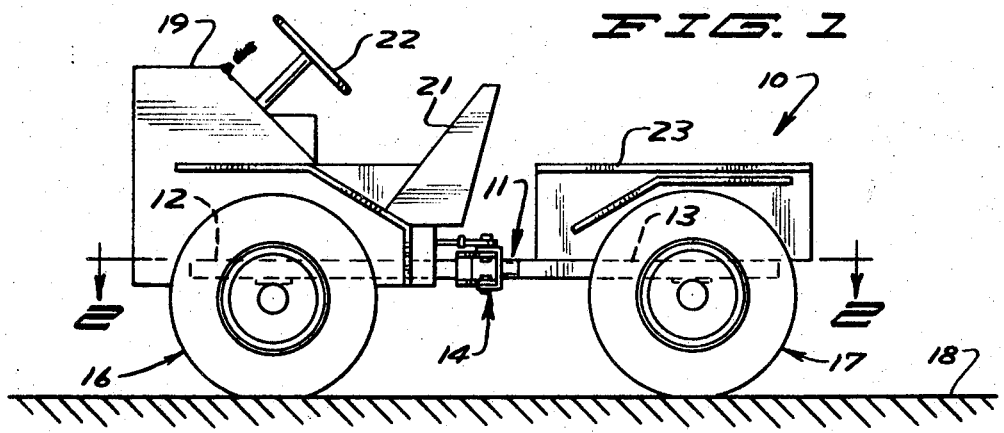
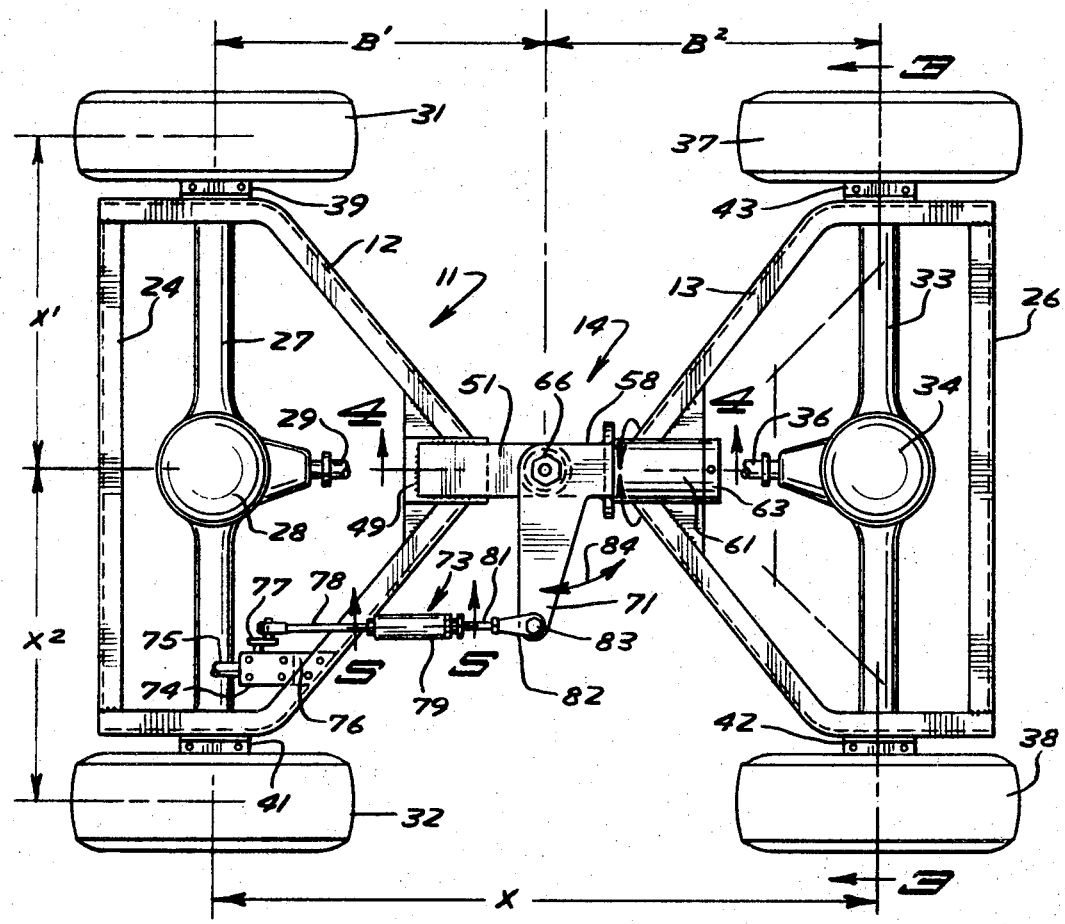

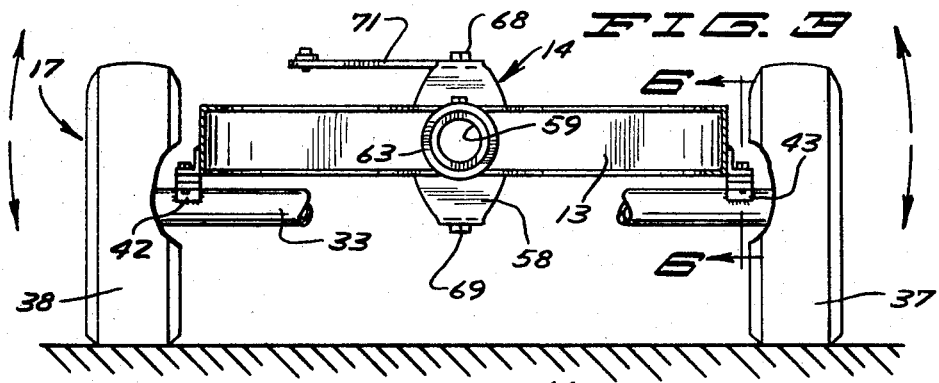
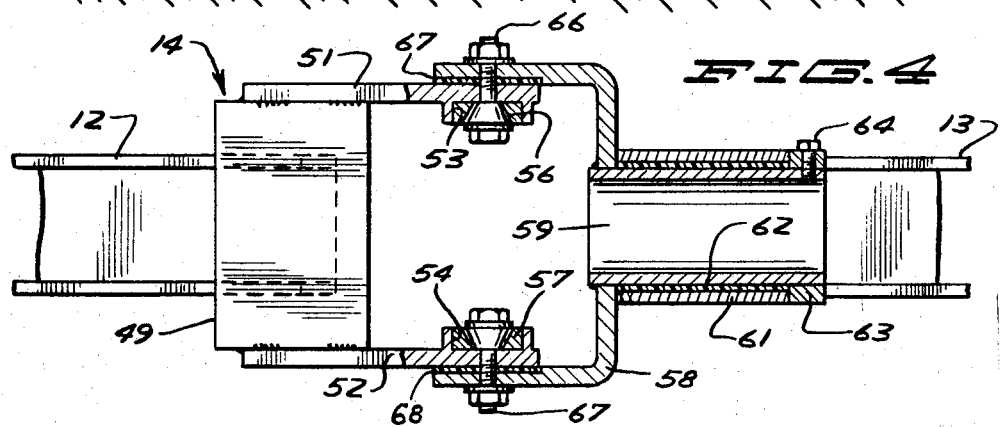
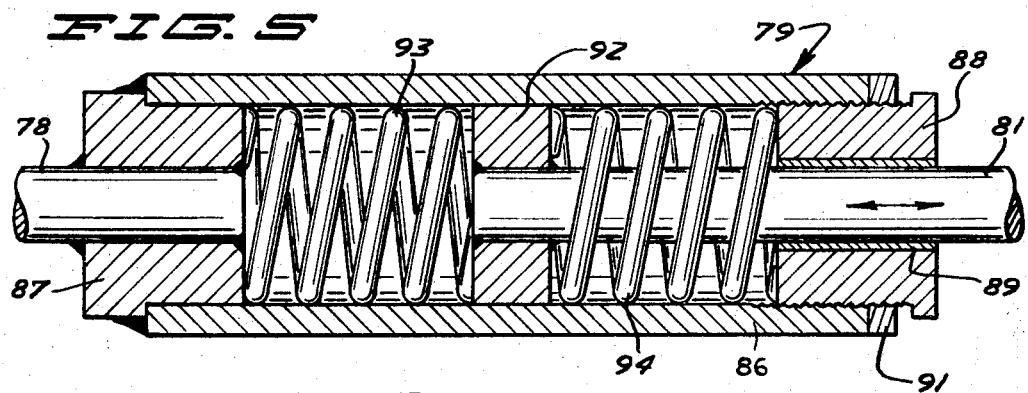
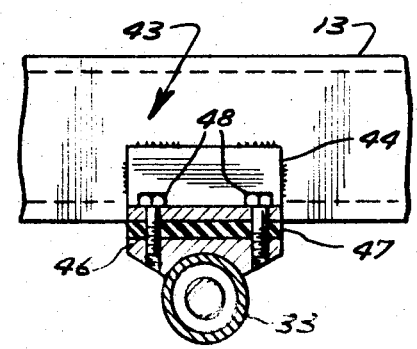
INVENTOR.
DONALD R. LEMMERMAN
BY
Burd, MacEachron, Braddock,
Bartz & Schwartz
ATTORNEYS United States Patent Office 3,437,163
Patented Apr. 8, 1969

ABSTRACT OF THE DISCLOSURE

A four-wheel drive vehicle having a front frame and rear frame joined together with an upright pivot located along the longitudinal center line of the vehicle. Identical front and rear wheel and axle assemblies each including a drive differential are secured to the frames equal longitudinal distances on opposite sides of the pivot so that the rear wheels move at all times in a tracking relation in respect to the front wheels. The upright pivot is part of a two-part coupling having a horizontal sleeve bearing allowing the frames to pivot about the longitudinal axis of the vehicle. One part of the coupling has a laterally directed arm connected to a spring biased yielding unit used to link the steering gear box to the end of the arm. The biasing unit yieldingly holds the frames in longitudinal alignment and is part of the steering linkage operable to move one frame relative to the other frame.

BACKGROUND OF INVENTION

Four-wheel drive vehicles having articulated frame assemblies and drive structures have been constructed with two degrees of freedom built into the frame assemblies to enable the wheels of the vehicle to conform to the contour of the ground. The steering of these vehicles is accomplished by articulating the frame assemblies between the front and rear wheels. In the steering and the operation of these vehicles the rear wheels do not track with the front wheels resulting in the disadvantage that in mud and snow the rear wheels have to break a new track on turns. These vehicles also have the disadvantages of instability and lack of momentum when striking an unyielding object, as a stone, stump or log. The steering systems of these four-wheel drive vehicles do not have the ability to conserve the energy of the wheel striking the object and subsequently releasing the energy to re-position in the wheel and frame in their longitudinal positions. Prior art four-wheel drive vehicle frame assemblies and steering structures, exemplified in the patent to Ewing No. 3,115,-205, have these disadvantages. The combined articulated frame assembly and steering structure of this invention has complete tracking of front and rear wheels at all times and allows for conservation of the energy of the wheels of the moving vehicle.

SUMMARY OF INVENTION

The invention relates to a wheeled vehicle having an articulated frame assembly divided into a front frame and a rear frame. Each frame carries a transverse wheel and axle assembly with the rear wheels longitudinally aligned with the front wheels. A coupling means joins the frames together with an upright pivot located along the longitudinal center line of the frames. The pivot is located at the longitudinal midpoint between the transverse wheel and axle assemblies. A steering linkage including a resilient biasing link connected to a portion of the coupling means yieldably holds the front and rear frames in longitudinal alignment as well as stores energy when one frame abruptly pivots relative to the other frame.

In the drawings:

FIGURE 1 is a side view of a four-wheel drive vehicle having the articulated frame assembly and yielding steering linkage of the invention;

FIGURE 2 is an enlarged sectional view taken along the line 2—2 of FIGURE 1 showing a top view of the frame assembly and yielding steering linkage of the vehicle;

FIGURE 3 is an enlarged sectional view taken along the line 3—3 of FIGURE 2 showing the rear frame and axle support;

FIGURE 4 is an enlarged sectional view taken along the line 4—4 of FIGURE 2 showing the pivot coupling and rotational joint connecting the front frame to the rear frame;

FIGURE 5 is an enlarged sectional view taken along the line 5—5 of FIGURE 2 showing the yielding link unit in the steering linkage; and FIGURE 6 is an enlarged sectional view taken along the line 6—6 of FIGURE 3 showing the resilient mount connecting the axle to the rear frame.

Referring to the drawings there is shown in FIGURE 1 a four-wheel drive vehicle 10 having an articulated frame assembly indicated generally at 11. The frame assembly 11 comprises a front frame 12 and a rear frame 13 joined together with a pivot coupling indicated generally at 14. Secured to front frame 12 is a front wheel and axle assembly 16. A similar rear wheel and axle assembly 17 is secured to rear frame 13 to support the vehicle on the surface of terrain 18. An engine (not shown) supported on frame 12 is covered with a hood 19. Rearwardly of the engine is a seat 21 facing a steering wheel 22. Rear frame 13 carries an open top box 23.

Referring to FIGURE 2, front frame 12 and rear frame 13 are generally Y-shaped with transverse braces 24 and 26 respectively across the ends of the side members of the frames. The front wheel and axle assembly 16 includes an axle housing 27 extended transversally under the side members of frame 12 and secured to the frame with mounts 39 and 41. The midportion of axle housing 27 carries a differential gear drive 28 having an input shaft 29. The wheels 31 and 32 are secured to the outer ends of the drive axles in housing 27. The rear frame 13 is attached to an identical wheel and axle assembly 17 having a transverse axle housing 33 and a differential gear drive 34 with an input shaft 36. Power from the engine is transmitted to the input shafts 29 and 36 by suitable mechanical power transmitting mechanisms or hydraulic motors supplied with fluid under pressure from a pump (not shown) driven by the engine. Rear wheels 37 and 38 are operatively attached to the outer end of the drive shafts enclosed in the axle housing 33. Mounts 42 and 43 secure opposite portions of the housing 33 to the frame 13.

All of the mounts 39 to 43 are identical in structure with mount 43 illustrated in detail in FIGURE 6. Mount 43 comprises an angular bracket 44 secured to the side of frame 13 having a portion extended over a plate 46 secured to the top of axle housing 33. Interposed between the bracket 44 and plate 46 is a resilient rubber pad 47 providing frame 13 with a limited spring or cushion. A pair of bolts 48 connect bracket 44 to pltae 46.

Referring to FIGURE 4, pivot coupling 14 is a combined hinge and swivel joint having a box-shaped support 49 permanently fixed to the converging ends of frame 12. An upper member 51 secured to the top of support 49 and a lower member 52 secured to the bottom to support 49 project rearwardly toward rear frame 13. Members 51 and 52 have inwardly facing recesses 53 and 54 respectively accommodating pivot bearings 56 and 57. Facing support 49 is a U-shaped member 58 having forwardly extending legs located over the terminal portions of upper member 51 and lower member 52. A horizontal tubular member 59 projected rearwardly from the mid-portion of member 58 has a cylinder swiveling surface for a sleeve 61. Opposite sides of the sleeve 61 are secured to the converging ends of frame 13. A cylindrical bearing 62, as an elongated nylon or Teflon washer, is interposed between the sleeve 61 and tubular member 59 to reduce the wear and friction. The sleeve 61 is held in assembled relation with tubular member 59 by a collar 63 attached to tubular member 59 with a bolt 64. Sleeve 61 being free to rotate on tubular member 59 allows the frame 13 as well as the rear wheel and axle assembly 17 to have limited rotational movement about the longitudinal axis of the frame assembly.

Member 58 is pivotally attached to the upper and lower members 51 and 52 by a pair of upright nut and bolt assemblies 67 and 68. Washers 67 and 68, as nylon or Teflon washers, interposed between facing portions of member 58 and members 51 and 52 reduce wear and friction between these members. In addition, the heads of the bolts co-act with the bearings 56 and 57 to provide relatively free upright pivot connections between the front and rear frames.

As shown in FIGURES 2 and 4, nut and bolt assembly 66 in vertical alignment with the nut and bolt assembly 67 making the pivot axis of the frame assemblies 66 and 67 extended upwardly in the longitudinal center line of the frames 12 and 13. In other words, the upright pivot axis of pivot coupling 14 is in a longitudinal line which is midway between the wheels shown by the distances $X^1$ and $X^2$. Distance $X^1$ equals distance $X^2$. In the longitudinal direction the pivot axis is located in the exact center of the frame assembly midway between the axes of rotation of the front and rear wheels shown by the distances $B^1$ and $B^2$. The distance $B^1$ equals the distance $B^2$. This precise vertical hinge to axle and wheel distance relationship is necessary to have complete tracking of the front and rear wheels at all times. In addition, this relationship makes it possible to use drive differentials which have the same gear ratios thereby eliminating gear reduction units to compensate for differences in gear ratios. In a turn, the wheels are always turning on the same arcs normal to the true turn radius at which the vehicle is moving.

Directed outwardly from the top portion of U-shaped member 58 is a lateral arm 71 connected to a steering linkage indicated generally at 73 used to articulate the frames 12 and 13 to steer the vehicle. As shown in FIGURE 2, steering linkage 73 comprises a gear box 74 having a forwardly facing input shaft 75 connected to the steering wheel 22 with suitable power transmitting mechanism (not shown). Gear box 74 is mounted on a bracket 76 secured to a portion of frame 12. Projected from the side of gear box 76 to a shaft and crank arm 77 connected to a tie rod 78. A biasing or yielding link unit 79 having a rearwardly directed rod 81 connects tie rod 78 to the arm 71. A clevis 82 and pin 83 are used to pivotally connect rod 81 to the end of arm 71. Clevis 82 is adjustably mounted on the end of rod 81. On operation of the steering gear box 74 by turning steering wheel 22, arm 77 moves the entire steering linkage, rod 78 and arm 71 about the axis of bolt and nut assembly 66 as indicated by arrow 84 thus articulating frames 12 and 13 relative to each other.

Referring to FIGURE 5, biasing link unit 79 comprises an elongated cylinder 86 closed at one end with plug 87. Tie rod 78 is secured by welds to the plug. An end member 88 having an axial bore is threaded into the opposite end of cylinder 86. A cylindrical bushing 89 is forced into the bores to provide a bearing for rod 81. The rod 81 reciprocates in bushing 89 and extends into the space between plug 87 and end member 88. The inner end of rod 81 is secured to a head 92 located in the cylinder on opposite sides of heavy coiled springs 93 and 94 resiliently maintained head 92 in the center of cylinder 86. The adjustment of end member 88 changes the tension on springs 93 and 94 and the effective length of the link between the crank arm 77 and the steering arm 71. Lock nut 91 is used to lock end member 88 with the cylinder 86.

In use, when one of the wheels of the rigid frames 12 or 13 strikes an object, as a large stone, the momentum and energy of the wheel is normally lost. The biasing link unit 79 cooperates with the articulated frame to absorb the energy of the wheel striking the object and at a later time accelerates the wheel back to its normal position. The springs 93 and 94 selectively compress on movement of the head 92 to store the energy of the wheel. In addition, springs 93 and 94 exert a biasing force which maintains the frames 12 and 13 in the longitudinal alignment with each other. The springs 92 and 93 are normally preloaded by adjusting end member 88 so that normal steering can be accomplished through the steering linkage. The pivot coupling with its exact vertical hinge to axle and wheel relationship enables the rear wheels to completely track the front wheels at all times and permits the use of two differentials of the same gear ratio as the front and rear wheels are always turning on an arc normal to the true turn radius.

The embodiments of the invention in which an exclusive property or privilege is claimed are defined as follows:

1. In a vehicle: a first frame, a first transverse wheel assembly mounted on the first frame, a second frame, a second transverse wheel assembly mounted on the second frame, coupling means connecting the first frame to the second frame, said coupling means having a first member attached to the first frame, a second member attached to the second frame, said first member and said second member having adjacent coacting portions, upright pivot means pivotally connecting said coacting portions, said upright pivot means located along the longitudinal center line of the frames and at the mid-point between said first and second transverse wheel assemblies, horizontal arm means secured to and projected laterally from the second member, a steering gear box mounted on the first frame forwardly of the arm means, said steering gear box having a power output member, and yielding expandable and contractable link means connected to the arm means and output member for yieldably holding the frames in longitudinal alignment and on movement of the power output member pivot the first frame relative to the second frame about the upright pivot means to steer the vehicle, said yielding means comprises a cylinder, a reciprocating rod projecting into cylinder, a head secured to the end of the rod in the cylinder, and biasing means located on opposite sides of the head for yieldably joining the rod to the cylinder.

2. The vehicle structure of claim 1 wherein the first member attached to the first frame has a horizontal upper plate and a horizontal lower plate and said second member attached to the second frame has a U-shaped yoke with legs located adjacent the upper plate and lower plate, said arm means secured to one of said legs, said upright pivot means including a first pin connecting one leg with the upper plate and a second pin connecting the other leg with the lower plate.

3. The vehicle structure of claim 1 wherein said biasing means comprise coil springs located on opposite sides of the head.

4. The vehicle structure of claim 1 wherein said second member includes a longitudinal cylinder and a sleeve rotatably mounted on the cylinder, said second frame being secured to the sleeve whereby the second frame is free to rotate about a horizontal axis independent of the first frame.

5. The vehicle structure of claim 1 wherein both the first and second wheel assemblies have differential drive units whereby the vehicle has a four-wheel drive.

6. The vehicle structure of claim 5 wherein the differential drive units have the same gear ratios.

7. The vehicle structure of claim 1 wherein the upright pivot means comprise a pair of vertically aligned pivot members.

References Cited

UNITED STATES PATENTS

| | | | |
|---|---|---|---|
| 1,745,117 | 1/1930 | Plank | 280—94 X |
| 1,773,986 | 8/1930 | Frazier | 74—582 |
| 3,130,806 | 4/1964 | Baer et al. | 180—51 X |
| 3,189,117 | 6/1965 | Ammon | 180—51 |

A. HARRY LEVY, *Primary Examiner.*

U.S. Cl. X.R.

74—582; 280—94